March 8, 1932. L. W. BEEBE 1,848,456
HOT AND COLD WATER WASH SINK AND LAVATORY FAUCET FIXTURE
Filed April 12, 1929
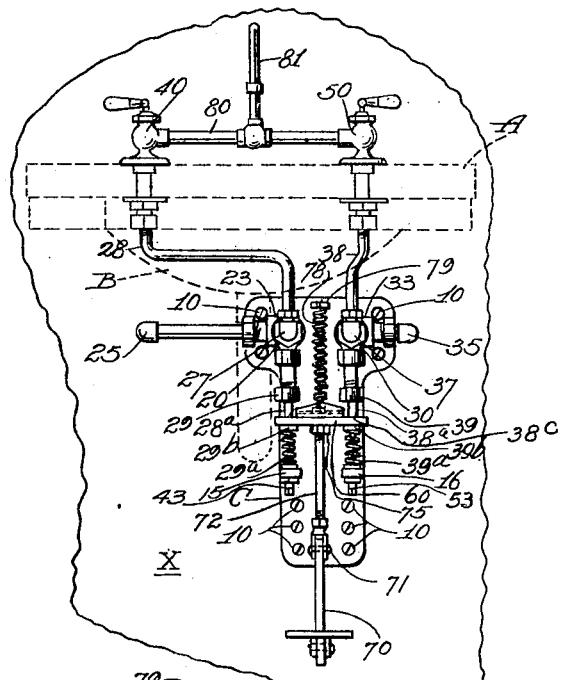
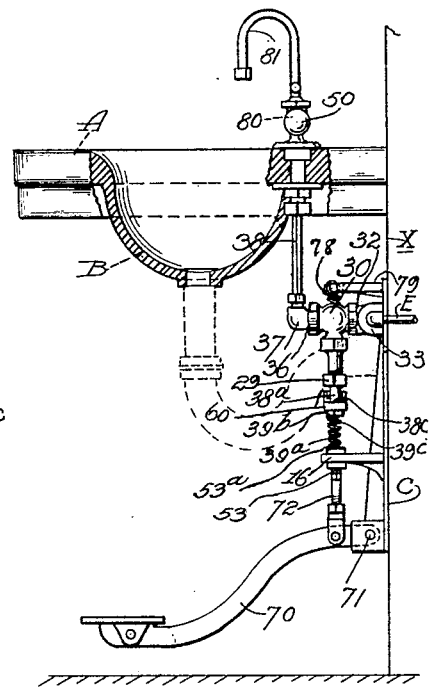
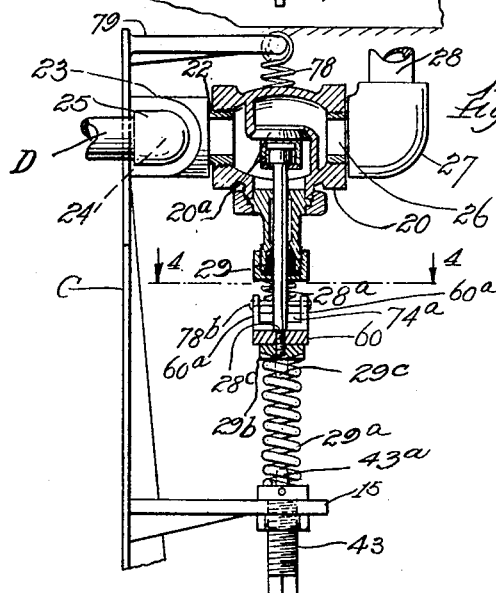
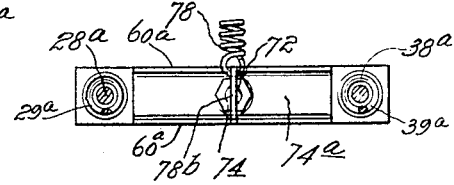
Witness
H. F. McKnight
Inventor.
Leslie W. Beebe.
by Burton & Burton
his Attorneys.

Patented Mar. 8, 1932

1,848,456

UNITED STATES PATENT OFFICE

LESLIE W. BEEBE, OF OAK PARK, ILLINOIS

HOT AND COLD WATER WASH SINK AND LAVATORY FAUCET FIXTURE

Application filed April 12, 1929. Serial No. 354,485.

The purpose of this invention is to provide an improved construction of a hot and cold water discharge fitting for lavatory basin, bathtub or kitchen sink, especially adapted also for hospital equipment, by reason of having valves which are adjustable to control the relative flow of hot and cold water for producing a properly temperature mixture, independent of valves which admit and shut off the flow of both hot and cold water, and which are operated otherwise than manually; so that the user has no occasion to touch valve handles or other operating parts, either for obtaining flow or for stopping the flow, and particularly the latter; so that, for example, a physician or nurse having occasion to resort to the basin for cleansing the hands preparatory to rendering surgical service, is not obliged to incur the risk of picking up disease germs from the valve handles by shutting off the water after the hand washing is performed. The invention consists in the special features of construction shown and described as indicated in the claims, by which the device is rendered economical to produce and install, and is adapted for installation on widely varying types and designs of lavatory stands, sinks, and the like.

In the drawings:

Figure 1 is a front elevation of a lavatory stand and basin equipped with valve and faucet fittings for hot and cold water connections constructed according to this invention.

Figure 2 is a partly sectional side elevation of the same.

Figure 3 is a detail partly sectional elevation looking in the opposite direction from Figure 2, showing one of the shut-off valves in vertical section.

Figure 4 is a detail view taken at the line 4—4 on Figure 3.

Referring particularly to the drawings:—
A represents the lavatory stand having the basin, B. C is a bracket plate adapted to be mounted on the wall, indicated at X, in front of and adjacent to which the stand is located, and from which the hot and cold water pipes shown at D and E respectively protrude for connection with the lavatory fittings.

The bracket plate, C, represented as secured to the wall by bolts, 10, is located below the tablet of the lavatory stand and has mounted on it fixedly in a manner hereinafter described, symmetrically with respect to a fore-and-aft vertical plane, valve bodies, 20 and 30, for connection respectively with hot and cold water pipes, D and E, for which connection said valve bodies have their inlets, represented at 22—32, respectively, connected by elbows, 23—33, preferably formed integrally with the bracket plate for presenting the inlets, 24—34 of said elbows, laterally and outwardly with respect to the valve bodies, 20—30, the water pipe connections being made to said laterally presented inlets of said elbows from pipe elbows seen at 25—35, respectively, to which respectively the hot and cold water pipes, D and E are connected. Said valve bodies have their outlets, 26 and 36, threaded at the forward side for connection by elbows, 27 and 37, with pipe elements, 28 and 38, extending up behind the basin, B, for connection respectively with hot and cold water valves, 40 and 50, respectively which are of adjustable type for controlling by their adjustment to different degrees of opening the relative flow of hot and cold water.

The valves, 20 and 30, are of any convenient or preferable type having their valve members seating and unseating by direct thrust and pull, said valves, as shown, being of common standard type of globe valve with the threads removed from the stems, 28$^a$ and 38$^a$, to permit the valve to seat and unseat, as stated, by direct thrust and pull.

The inlets of the assembly comprising the valve bodies and elbows, 23 and 33, rigid with the bracket plate, being lateral with respect to the valve bodies, respectively, and the outlets of the complete assembly comprising the elbows, 27 and 37, being upward, the entire unit comprising the bracket plate and valve bodies and connections mounted thereon is adapted to be mounted in proper relation to a lavatory stand or wash sink of any usual design and having mounted on it hot and cold water valves of any usual design and in any usual symmetrical position.

The valve stems, 28ª and 38ª, stripped of their threads, as mentioned, protrude downwardly from the valve bodies, 20 and 30, respectively, through stuffing boxes indicated at 29, 39, respectively, and the valve, 20ª in said valve bodies, 20 and 30, are arranged to be normally held seated by springs, 29ª, 39ª, arranged to react on the valve stems with which they are respectively engaged at their upper ends, being stopped at the lower ends by lugs, 15 and 16, formed projecting from the face of the bracket plate, C.

From this description it may be understood that the springs, 29ª, 39ª, operate to hold the valves, 20ª and 30ª, respectively, normally seated, cutting off flow from the hot and cold water pipes, D and E, respectively, and automatically re-seating the valves after they have been opened by the means provided, when the opening means is released by the operator.

For operating the shut-off valves substantially simultaneously and equally, as required by the purpose of the invention, as above stated, there is provided a cross bar, 60, having apertures adapting it to pass loosely on the two stems, 28ª and 38ª, up to shoulders, 28ᶜ and 38ᶜ, which are formed on said stems by reducing their diameter for threading the stems at said reduced part for receiving cap nuts, 29ᵇ, 39ᵇ, which have at their lower sides axial projections, 29ᶜ, 39ᶜ, serving to center the upper ends of the springs, 29ª and 39ª, said springs being centered at their lower ends by centering pins, 43ª, 53ª, projecting from adjusting screws, 43, 53, set through the lugs, 15, 16, respectively. The nuts, 29ᵇ, 39ᵇ, are screwed tightly onto the threaded ends of the stems but not so as to clamp the cross bar tightly against the shoulders, 28ᶜ, 38ᶜ, the intention being that there shall be slight accommodation at these connections of the cross bars to the stems for a purpose hereinafter explained.

For operating the shut-off valves, 20 and 30, there is provided a pedal, 70, fulcrumed at 71 on the bracket plate, C, and connected by a link, 72, to the cross bar, 60, at the middle point of the latter, said connection being effected by nuts, 74 and 75, applied to the link respectively above and below the cross bar.

To ensure that the action of the pedal for opening the valves shall not be embarrassed either by the looseness or tightness of the joints in the line of connection, and that the valves shall be opened substantially equally and simultaneously under all circumstances, as for example, notwithstanding the unequal wear of the two valves may cause one to be liable to seat and open a little ahead of the other, and notwithstanding variation which may arise in the stiffness of the two springs, the connection of the cross bars to the stems is made slightly loose, as above explained, and the attachment of the link, 72, to the cross bar is effected by means of the two nuts of which the upper nut, 74, has a flange or cross head, 74ª, making it T-form, said cross head, 74ª, being flat on its under face for seating on the upper side of the cross bar over substantially the entire distance between the two valve stems; and to prevent the link or the nut from turning in the cross bar, the latter is formed with upwardly projecting flanges 60ª, 60ª at its front and rear edges forming a channel in which the cross head fits loosely. These flanges are also quite desirable for the purpose of stiffening the cross bar which is exposed to very substantial strain in the action of opening the valves which may be many times under considerably high pressure. Also the cross bar is slightly loose between the nuts, 74 and 75, so that one end may move upward further than the other and follow its respective valve stem, if the valve stem travels further than the other in closing.

Desirably for two purposes,—first, supplementing the action of the springs, 29ª and 39ª, for holding the valves seated, and second, for sustaining the weight of the pedal and connections, thereby relieving the other springs from that duty, there is provided a stretched spring, 78, connected at its upper end to a lug, 79, which projects forwardly from the bracket plate near the upper end in a vertical fore-and-aft plane midway between the two valve bodies, 20 and 30, and at the lower end to the middle point of the cross bar, as seen at 78ᵇ.

It may be recognized that this third spring might be adapted to perform the entire function of holding the valve seated and supporting the pedal, and on the other hand the two springs, 29ª and 39ª, might be made competent to perform both functions satisfactorily. But it is considered preferable to employ the three springs for supplementing each other, somewhat distributing the functions mentioned among them.

I wish it understood that the invention is not limited either to two springs, or to the third spring, or to the use of all three springs, but it includes the employment of the two springs on the valve stems respectively with or without the third spring, and it includes the use of a third spring with or without the two springs, and also includes the use of all three springs.

I wish it understood that the invention is not limited to the particular form of the hot and cold water valves, 40 and 50, or to their position on the stand, which, as stated, may be any usual or preferred position, desirably symmetrical with respect to the basin. But preferably the two valve bodies, 40 and 50, are connected by a pipe member, 80, which constitutes a mixing chamber or passage for the hot and cold water, a discharge nozzle in common for the mixture being provided, as seen at 81, connected at the middle point in the length of said mixing pipe, 80, so that the mixture is effected before the discharge, rather than merely in the basin, as would be the case if the valve bodies, 40 and 50, were arranged to discharge independently and simultaneously into the basin.

I claim:

1. An apparatus for the purpose indicated adapted to be mounted in connection with a lavatory stand and basin, comprising in combination, a mounting plate for pipe connections arranged for securement below the stand top to a wall adjacent to the basin, said wall containing hot and cold water pipes, valve bodies mounted on said plate in position to be below the stand top, comprising each a vertical reciprocating shut-off valve, said valve bodies having their inlets connected respectively with the hot and cold water supply pipes, and their outlets arranged to be connected respectively with separate valve bodies.

2. An apparatus for the purpose indicated adapted to be mounted in connection with a lavatory stand and basin, comprising, a mounting plate for pipe connections thereto arranged for securement below the stand top to a wall adjacent the basin, said wall containing hot and cold water supply pipes, valve bodies mounted on said plate in position to be below the stand top comprising each a vertically reciprocating shut-off valve; pipe fitting connections from the hot and cold water pipes to the inlets of said valve bodies respectively; two valve bodies having valves adapted to be adjusted to varying degrees of opening independently of each other and of said shut-off valves; connections from said valve bodies arranged for discharge into the basin, and pipe fitting connections from the outlets of the first mentioned to the inlets of the second mentioned valve bodies respectively.

3. An apparatus for the purpose indicated adapted to be mounted in connection with a lavatory stand and basin and comprising pipes for conducting respectively hot and cold water; valves in said pipes respectively adapted to be adjusted as to degree of opening for controlling the relative flow of hot and cold water through said pipes for discharge in the basin, said pipes having connections antecedent to their respective valves with sources of hot and cold water respectively; shut-off valves independent of said adjustable valves arranged in said connections respectively, and pedal operated means for controlling said shut-off valves arranged to operate said valves simultaneously and equally, the two shut-off valves being arranged vertically and parallel with each other, a cross bar engaged with their stems, and springs reacting between the stems respectively and stops for holding the said last-mentioned valves normally seated, and means connected with the cross bar and accessible for actuation at will below the stand tablet for retracting the valve stems downwardly for opening said valves simultaneously.

4. An apparatus for the purpose indicated adapted to be mounted in connection with a lavatory stand and basin and comprising pipes for conducting respectively hot and cold water; valves in said pipes respectively, adapted to be adjusted as to degree of opening for controlling the relative flow of hot and cold water through said pipes for discharge in the basin, said pipes having connections antecedent to their respective valves with sources of hot and cold water respectively; shut-off valves independent of said adjustable valves arranged in said connections respectively; means accessible for actuation at will below the basin for controlling said shut-off valves arranged to operate said valves simultaneously and equally, the two shut-off valves being arranged vertically and parallel with each other, a cross bar engaged with their stems, and springs reacting between the stems respectively and stops for holding the said last mentioned valves normally seated, and a pedal operatively connected with said cross bar for retracting the valve stems downwardly for opening and closing both said valves simultaneously.

5. An apparatus for the purpose indicated adapted to be mounted in connection with a lavatory stand and basin and comprising pipes for conducting respectively hot and cold water; valves in said pipes respectively, adapted to be adjusted as to degree of opening for controlling the relative flow of hot and cold water through said pipes for discharge in the basin, said pipes having connections antecedent to their respective valves with sources of hot and cold water respectively; shut-off valves independent of said adjustable valves arranged in said connections respectively, and pedal operated means for controlling said shut-off valves arranged to operate said valves simultaneously and equally, the shut-off valves being mounted for vertical reciprocation for opening and closing, a plate upon which said valves are mounted, said valves having their stems extending along the face of the plate, the plate having apertured lugs with which the stems are engaged for guidance of the latter; springs coiled about the stems respectively reacting between stops on the stems and the guide lugs for yieldingly holding the valves upwardly at seating position, and a cross bar rigidly connecting the stems and operatively connected to the shut-off-valve-controlling means.

6. An apparatus for the purpose indicated adapted to be mounted in connection with a lavatory stand and basin and comprising pipes for conducting respectively hot and cold water; valves in said pipes respectively, adapted to be adjusted as to degree of opening for controlling the relative flow of hot and cold water through said pipes for discharge in the basin, said pipes having connections antecedent to their respective valves with sources of hot and cold water respectively; shut-off valves independent of said adjustable valves arranged in said connections respectively, and pedal-operated means for controlling said shut-off valves arranged to operate said valves simultaneously and equally, the shut-off valves being mounted for vertical reciprocation for opening and closing, and a plate on which said valves are mounted, said valves having their stems extending along the face of the plate, the plate having apertured lugs with which the stems are engaged for guidance of the latter; a cross bar connecting the stems and means fixed with respect to the plate stopping the cross bar longitudinally of the stems above said lugs, and springs coiled about the stems reacting between the cross bar and said lugs for normally holding the valves upwardly at seated position.

7. An apparatus for the purpose indicated adapted to be mounted in connection with a lavatory stand and basin, and comprising a mounting plate for pipe connections thereto arranged for securement below the stand top adjacent a wall from which hot and cold water pipes protrude; valve bodies mounted on said mounting plate at the forward side thereof below the stand top comprising each a vertically reciprocating shut-off valve; a cross bar operatively connecting the stems of said shut-off valves; a pedal fulcrumed on the mounting plate and a link connecting the pedal with the cross bar, and a stretched spring above the cross bar secured at its upper end to the mounting plate and extending between the valve bodies and connected at its lower end to the cross bar.

8. An apparatus for the purpose indicated adapted to be mounted in connection with a lavatory stand and basin, and comprising pipes for conducting respectively hot and cold water; valves in said pipes respectively, adapted to be adjusted as to degree of opening for controlling the relative flow of hot and cold water through said pipes for discharge in the basin, said pipes having connections antecedent to their respective valves with sources of hot and cold water respectively; shut-off valves independent of said adjustable valves arranged in said connections respectively; means accessible for actuation at will below the basin for controlling said shut-off valves arranged to operate said valves simultaneously and equally, spring means operating upon the shut-off valves respectively for holding them normally seated, an operating connection between the stems of said valves for opening them simultaneously, and spring means associated with said operating connection reacting on said connection for movement in the direction of the seating movement of the valves, the means for actuation at will being connected with said operating connection for utilizing said operating connection between the valves in the actuation of the valves for opeing.

9. An apparatus for the purpose indicated adapted to be mounted in connection with a lavatory stand and basin, and comprising a mounting plate for pipe connections thereto arranged for securement below the level of the stand top adjacent a wall in which hot and cold water pipes are located; valve bodies mounted on said mounting plate at the forward side thereof at a position for being below the level of the stand top comprising each a vertically reciprocating shut-off valve; springs reacting each at one end on the mounting plate and at their opposite ends on the valve stems respectively for holding the valves normally seated, means accessible for actuation at will below the basin, and operating connections therefrom for actuating the valves in opening direction, a cross bar connecting the valve stems comprised in said operating connections, and a spring reacting at one end on the mounting plate and at the other end on the cross bar in the direction of the closing movement of the valves.

10. An apparatus for the purpose indicated adapted to be mounted in connection with a lavatory stand and basin, and comprising a mounting plate for pipe connections thereto arranged for securement below the position of the stand top adjacent a wall from which hot and cold water pipes protrude; valve bodies mounted on said mounting plate at the forward side thereof below the position of the stand top comprising each a vertically reciprocating shut-off valve; springs reacting each at one end on the mounting plate and at their opposite ends on the valve stems respectively for holding the valves normally seated, the means by which the springs react on the mounting plate consisting of lugs projecting from said plate and adjusting screws set through said lugs formed at their upwardly protruding ends each with a stop shoulder and a centering pin for the lower ends of the springs, the valve stems being each provided with a terminal having a stop shoulder and a centering pin for the upper ends of the springs.

11. An apparatus for the purpose indicated adapted to be mounted in connection with a lavatory stand and basin and comprising pipes for conducting respectively hot and cold water; valves in said pipes respectively adapted to be adjusted as to degree of opening for controlling the relative flow of hot and cold water through said pipes for discharge in the basin, said pipes having connections antecedent to their respective valves with sources of hot and cold water respectively; shut-off valves independent of said adjustable valves arranged in said connections respectively; means accessible for actuation at will below the basin for controlling said shut-off valves arranged to operate said valves simultaneously and equally, the shut-off valves being mounted symmetrically with respect to a vertical fore-and-aft plane, and having inlet connections of which the inlets are located laterally at the remote sides of the respective valve bodies, said valve bodies having their outlets located at their forward sides, said inlets and outlets being both arranged for elbow connections, the outlets upwardly with the adjustable valves, and the inlets rearwardly with the hot and cold water pipes.

12. An apparatus for the purpose indicated adapted to be mounted in connection with a lavatory stand and basin and comprising pipes for conducting respectively hot and cold water; valves in said pipes respectively adapted to be adjusted as to degree of opening for controlling the relative flow of hot and cold water through said pipes for discharge in the basin, said pipes having connections antecedent to their respective valves with sources of hot and cold water respectively, shut-off valves independent of said adjustable valves arranged in said connections respectively; means accessible for actuation at will below the basin for controlling said shut-off valves arranged to operate said valves simultaneously and equally, the shut-off valves being mounted symmetrically with respect to a vertical fore-and-aft plane, and with their respective inlet connections situated symmetrically with respect to said plane, and with their respective outlet connections also situated symmetrically with respect to said plane, said connections of the one character being located laterally at the remote side of the respective valve bodies, and said connections of the other character being located at the forward side of the respective valve bodies, said inlets and outlets being both arranged for elbow connections, the outlets upwardly with the adjustable valve, and the inlets rearwardly with the hot and cold water pipes.

In testimony whereof, I have hereunto set my hand at Oak Park, Ill., this 3rd day of April, 1929.

LESLIE W. BEEBE.